(12) United States Patent
Broucke et al.

(10) Patent No.: US 11,629,746 B2
(45) Date of Patent: Apr. 18, 2023

(54) NUT-LOCKING DEVICE AND ASSOCIATED ASSEMBLY UNIT

(71) Applicant: LISI AEROSPACE, Paris (FR)

(72) Inventors: Martial Broucke, Delincourt (FR); Gildas Boleis, Lantic (FR); Alan Philippe, Lamballe (FR); Pierre Petit, Francheville (FR)

(73) Assignee: LISI AEROSPACE, Paris (FR)

( * ) Notice: Subject to any disclaimer, the term of this patent is extended or adjusted under 35 U.S.C. 154(b) by 268 days.

(21) Appl. No.: 16/649,973

(22) PCT Filed: Sep. 25, 2018

(86) PCT No.: PCT/EP2018/075977
§ 371 (c)(1),
(2) Date: Mar. 23, 2020

(87) PCT Pub. No.: WO2019/063553
PCT Pub. Date: Apr. 4, 2019

(65) Prior Publication Data
US 2020/0224708 A1 Jul. 16, 2020

(30) Foreign Application Priority Data
Sep. 26, 2017 (FR) .................................. 1758886

(51) Int. Cl.
*F16B 39/30* (2006.01)
(52) U.S. Cl.
CPC .................................. *F16B 39/30* (2013.01)
(58) Field of Classification Search
CPC ........ F16B 39/30; F16B 39/28; F16B 39/284; F16B 39/34; F16B 39/282; F16B 39/38

USPC ......................................................... 411/288
See application file for complete search history.

(56) References Cited

U.S. PATENT DOCUMENTS

| 222,220 A | 12/1879 | Wynkoop |
| 5,248,232 A | 9/1993 | Chiang |
| 5,622,465 A * | 4/1997 | Junkers .................. F16B 31/04 411/917 |

(Continued)

FOREIGN PATENT DOCUMENTS

| CN | 106246698 | * 12/2016 |
| CN | 106246698 A | 12/2016 |

(Continued)

OTHER PUBLICATIONS

Pöll, Andreas, International Search Report, dated Feb. 1, 2019, 2 pages, European Patent Office, Rijswijk, Netherlands.

*Primary Examiner* — Mark R Wendell
(74) *Attorney, Agent, or Firm* — Henricks Slavin LLP

(57) ABSTRACT

The invention concerns a unit (210) for a locking device, comprising: a nut (212) comprising two coaxial taps in opposite directions; and a ring (213); said ring including a third tap (38); the first (18) and third (38) taps being capable of engaging with a single first thread (22); said ring including a second thread (40) capable of engaging with the second tap (20) of the nut. The unit further comprises a washer (214) configured (274) so as to be inserted around one (212) of the nut and the ring, the washer comprising an elastic engagement means (272) for engaging with the other (213) of the ring and the nut in an installation position of the unit, so as to prevent the ring and the nut from rotating relative to each other.

9 Claims, 5 Drawing Sheets

(56) References Cited

U.S. PATENT DOCUMENTS

| | | | | |
|---|---|---|---|---|
| 5,855,463 | A | 1/1999 | Newby | |
| 6,257,815 | B1 * | 7/2001 | Nonaka | F16B 39/18 411/223 |
| 9,447,809 | B2 * | 9/2016 | Regnard | F16B 33/06 |
| 10,203,191 | B2 * | 2/2019 | Berthou | G01B 3/36 |
| 11,187,259 | B2 * | 11/2021 | Berthou | F16B 33/06 |
| 11,466,723 | B2 * | 10/2022 | Boleis | F16B 39/16 |

FOREIGN PATENT DOCUMENTS

| | | |
|---|---|---|
| DE | 459064 | 4/1928 |
| EP | 0130304 | 9/1986 |
| FR | 685896 | 7/1930 |
| FR | 1021911 | 2/1953 |
| GB | 2258026 | 1/1993 |
| GB | 2282202 | 3/1995 |
| WO | WO 97/18925 | 5/1997 |

* cited by examiner

NUT-LOCKING DEVICE AND ASSOCIATED ASSEMBLY UNIT

CROSS REFERENCE TO RELATED APPLICATIONS

This application is a National Stage Application of International Application No. PCT/EP2018/075977, filed Sep. 25, 2018, which claims priority from FR 17 58886 filed Sep. 26, 2017, the entire contents of which are incorporated herein by reference.

The present invention relates to a locking device, of the type comprising: a shaft comprising a first thread, and a nut and a ring intended to be assembled on the shaft. The nut comprises a first tapping adapted to cooperate with the first thread of the shaft, said first thread and tapping defining a first radial clearance; the nut further comprising a second tapping opposite the first tapping, the first and second tapping being coaxial; an outer surface of the ring comprising a second thread capable of interacting with the second tapping of the nut, said second thread and tapping defining a second radial clearance; an inner surface of said ring comprising a third thread capable of interacting with the first thread of the shaft, said first thread and third tapping defining a third radial clearance.

Such a locking device is in particular known from document EP0130304. In order to clamp elements positioned on a threaded screw in abutment against the screw head, the ring is screwed in the opposite direction into the nut, then the nut and the ring are installed together on the screw until the nut clamps the elements against the head of the screw. In order to finalize the tightening, the ring is screwed in the opposite direction into the nut until the thread flanks' 'screw/nut', 'nut/ring' and 'ring/screw' are in contact with each other.

In this configuration, the thread flanks 'screw/nut' and 'ring/screw' undergo wedge forces in opposite directions due to the reverse-direction thread of the 'ring/nut' assembly. These opposing forces tend to push the nut from the ring, and to push the nut against the screw head, thus to maintain the tightened elements. Under the effect of vibrations tending to unscrew either the nut or the ring, the reverse-direction thread causes the other element to be screwed: the nut locking device is then anti-unscrewing by construction.

The document EP0130304 uses different pitches between the thread of the assembly 'ring/nut' on the one hand, and the threads of the 'screw/nut' and 'screw/ring' assemblies, on the other hand, in order to allow the ring to rotate relative to the nut- and vice versa-over a fairly wide angle. Without this freedom of rotation, the locking device would lock under the impression of a very small angle, of the order of a few degrees, which would make it impossible to dismantle or mount it virtually impossible. However, the use of finer or wider pitches has the disadvantage of making the assembly difficult to mount and lock, because the angle of rotation of one of the elements of the device is limited by the length of the smallest pitch of these elements.

A first aspect of the invention is to provide a locking device comprising a nut and a ring having reverse-direction threads, without the disadvantages of prior art locking devices.

To this end, the first aspect of the invention is a locking device of the aforementioned type, in which the first, second and third tappings and the first and second threads have an identical and constant thread pitch; and each of the second and third radial clearances is greater than the first radial clearance.

The invention further relates to an assembly for a locking device of the type comprising: a nut comprising a first and a second tapping coaxial and opposite direction; and a ring; an inner surface of said ring comprising a third tapping, the first and third tappings being capable of cooperating with a same first thread; an outer surface of said ring comprising a second thread capable of cooperating with the second tapping of the nut.

According to the first aspect of the invention, the first and third tappings are capable of cooperating with a same first thread with a standardized ISO triangular profile, so as to define with said first thread a first and a third radial clearance; the second thread is able to cooperate with the second tapping so as to define a second radial clearance; the first, second and third tappings and the second thread have an identical and constant thread pitch; each of the first and second threads has a standardized ISO triangular profile; and the second and third threads have an ISO triangular profile, a thread flank diameter of which is greater than the thread flank diameter of the standard ISO triangular profile, such that each of the second and third radial clearances is greater than the first radial clearance.

According to other advantages of the first aspect of the invention, the assembly comprises one or more of the following features, taken separately or according to all technically possible combinations:

- each of the thread flank diameters of the second and third tappings is increased by a same offset value with respect to the thread flank diameter of the corresponding standardized ISO triangular profile;
- the offset value A Is defined according to the following formula:

$A \geq (2P \times \alpha)/(360° \times \tan \beta)$ with α=desired minimum clamping angle, expressed in degrees, and β=half angle of the ISO thread, expressed in degrees;
- the desired minimum clamping angle is between 10° and 60°;
- the nut comprises first driving surfaces for rotatably driving said nut relative to the shaft and/or relative to the ring; the ring comprises second driving surfaces for rotatably driving said ring relative to the shaft and/or relative to the nut; said first and second driving surfaces being configured to align with each other, so as to enable rotational driving of the nut together with the ring;
- the first and second drive surfaces are formed by planes substantially parallel to an axis of rotation of the nut and/or of the ring.

The first aspect of the invention further relates to a locking device as described above, comprising a shaft and an assembly as described above, wherein the first thread of the shaft has a standardized ISO triangular profile.

A second aspect of the invention is to provide a locking device comprising a nut and a ring equipped with a visual marking indicating that said nut and said ring are, or not, correctly locked.

To this end, the second aspect of the invention is an assembly for a locking device of the aforementioned type, extending along a main axis, in which: a portion of the ring, projecting radially external with respect to the second thread, comprises at least one through-hole along the main axis; and a surface of the nut, perpendicular to the main axis, comprises at least one visual marking, said at least one visual marking being configured to be facing the at least one through-hole when the nut and the ring are in an installation position, and away from said at least one through-hole when the nut and the ring are out of said installation position.

According to another advantage of the second aspect of the invention, the portion of the ring comprises a number of through-holes of between two and ten, preferably equal to six, said through-holes being regularly distributed around the main axis; and the surface of the nut comprises a same number of visual markings, each of said visual markings being configured to face one of the through-holes when the nut and the ring are in an installation position, and away from said through-hole when the nut and the ring are out of said installation position.

The second aspect of the invention can be implemented alone or in combination with the first aspect of the invention.

A third aspect of the invention is to provide a locking device comprising a nut and a ring associated with a positive locking means. The term "positive locking means" refers to a third part that has to be broken or plastically deformed to allow the ring to rotate with respect to the nut once the locking device is in the locked position.

To this end, the third aspect of the invention is an assembly for a locking device of the aforementioned type, extending along a main axis and further comprising a washer configured so as to be inserted around one of the nut and the ring, in a rotationally fixed manner with respect to said nut or to said ring, the washer comprising a means of elastic engagement with the other of the ring and of the nut in an installation position of the assembly, so as to prevent rotation relative to each other of the ring and the nut from said installation position.

According to other advantages of the third aspect of the invention, the locking device assembly comprises one or more of the following features, taken separately or according to all technically possible combinations:
  the washer comprises an annular body and at least one tab projecting radially with respect to said annular body, said annular body comprising a means for blocking in rotation with one of the nut and the ring, said at least one tab being elastically deformable between a rest configuration and a stress configuration, in which the at least one tab is respectively in axial projection with respect to the annular body and substantially coplanar with said annular body, the assembly being configured such that, in the installation position, the at least one tab is in the rest configuration, the axial projection of said at least one tab being able to block in rotation relative to each other the ring and the nut;
  the nut and the ring respectively comprise first and second surfaces substantially perpendicular to the main axis, such that, when the nut and the ring are in an angular configuration different from the installation position, said first and second surfaces are able to hold the at least one tab in the stress configuration, one of the first or second surfaces comprising at least one notch capable of being assembled with said at least one tab in the rest configuration in the installation position of the assembly.

The third aspect of the invention can be implemented alone or in combination with the first and/or second aspect of the invention.

According to other advantages of the second or third aspect of the invention, the locking device assembly comprises one or more of the following features, taken separately or according to all technically possible combinations:

the first, second and third tappings and the second thread have an identical and constant thread pitch;
  the nut comprises first driving surfaces for rotatably driving said nut relative to the first thread and/or relative to the ring; the ring comprises second driving surfaces for rotatably driving said ring relative to the first thread and/or relative to the nut; said first and second driving surfaces being configured to align with each other, so as to enable rotational driving of the nut together with the ring;
  the first and second drive surfaces are formed by planes substantially parallel to the main axis.

The second or third aspect of the invention further relates to a locking device comprising: a shaft comprising a first thread, and an assembly as described above, the first and third tappings being able to cooperate with said first thread. Preferably, the installation position corresponds to a contact of thread flanks of the first and third tappings with thread flanks of the first thread.

The invention further relates to a mounting kit for a locking device, said mounting kit comprising: an assembly for a locking device as described above; and a mounting tool comprising a tubular socket, one end of said socket comprising an inner surface capable of engaging with the first and second driving surfaces, respectively of the nut and of the ring, for rotational driving of the nut together with the ring.

According to other advantages of the third aspect of the invention, the assembly of said mounting kit comprises the washer described above; and the mounting tool of said mounting kit further comprises a tubular sheath comprising a first and a second end, capable of engaging respectively with the inner surface of the socket and with the second driving surfaces of the ring, for rotational driving of the ring with respect to the nut; the sheath further comprising at least one projection capable of deforming the at least one tab of the washer from the rest configuration to the stress configuration, so as to allow rotation of the ring relative to the nut from the installation position.

The invention will be better understood on reading the following description, given solely by way of non-limiting example and made with reference to the drawings, in which.

Figure 1:
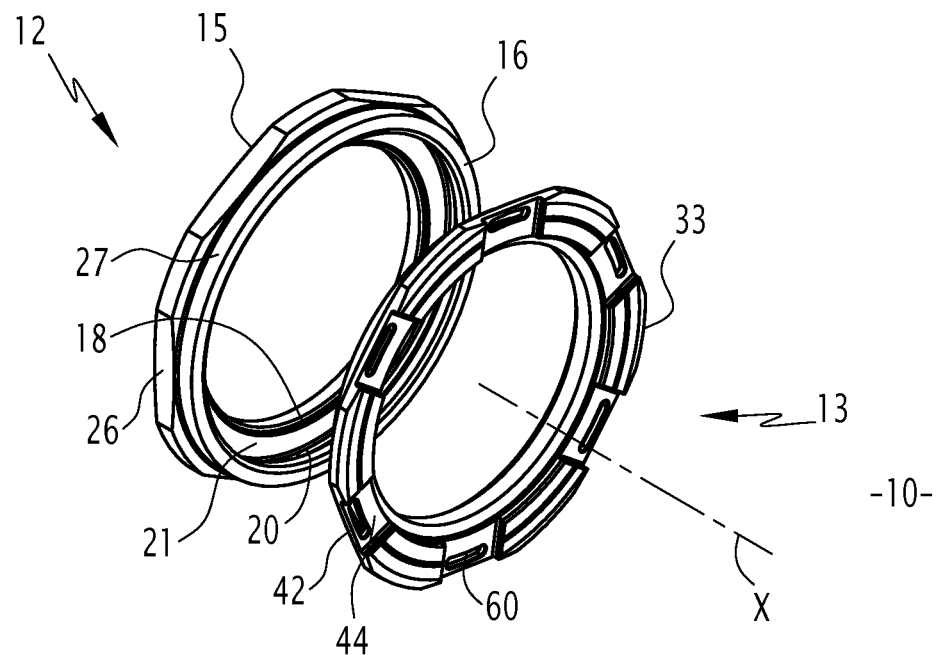
FIGS. 1, 2 and 3 are exploded perspective views of an assembly for a locking device, respectively according to a first, a second and a third embodiment of the invention.
Figure 2:
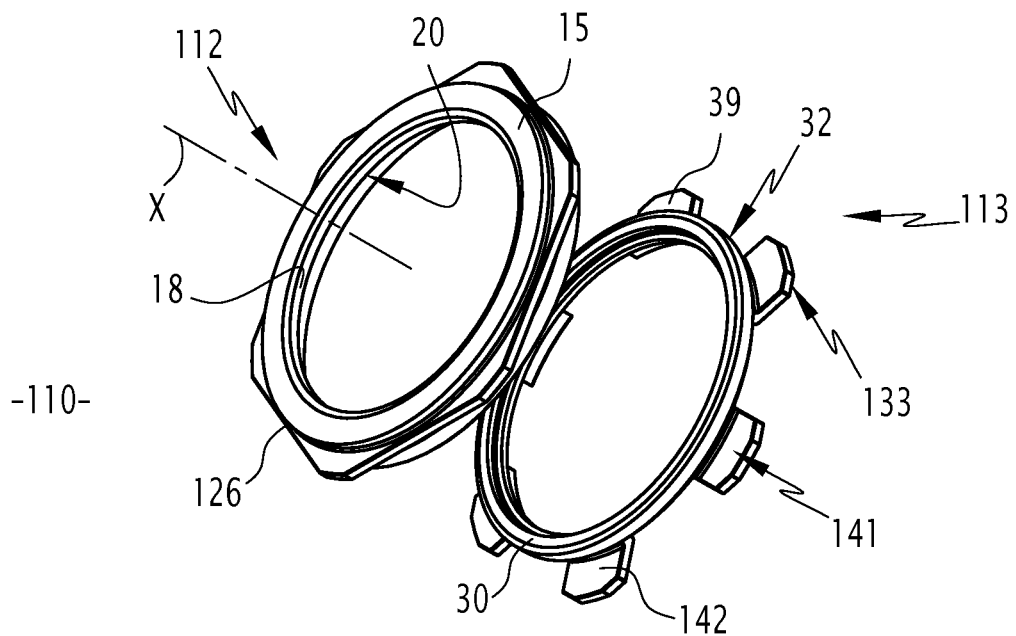
Figure 3:
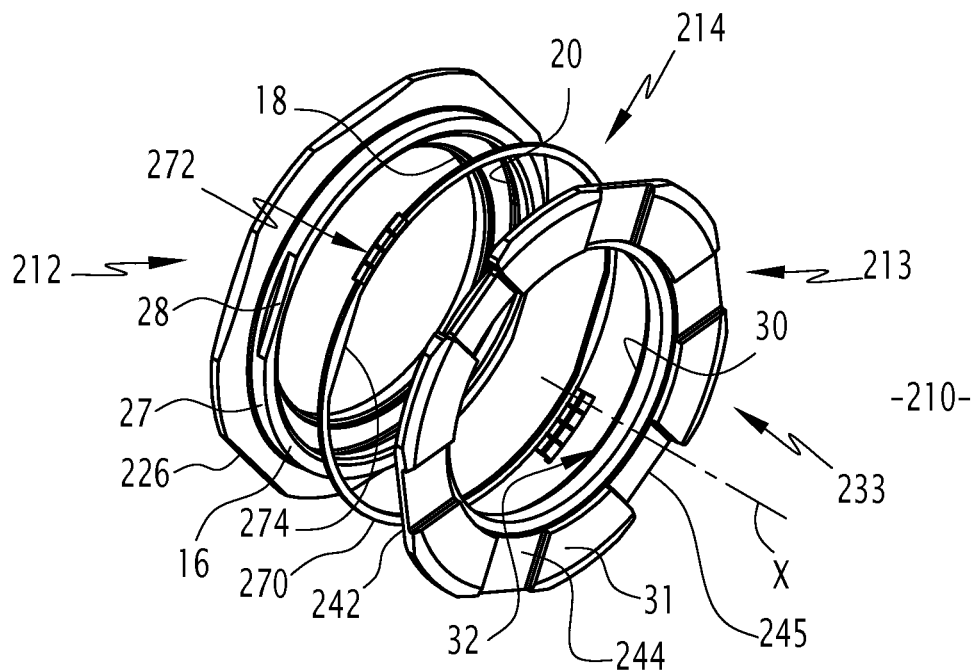
Figure 4:
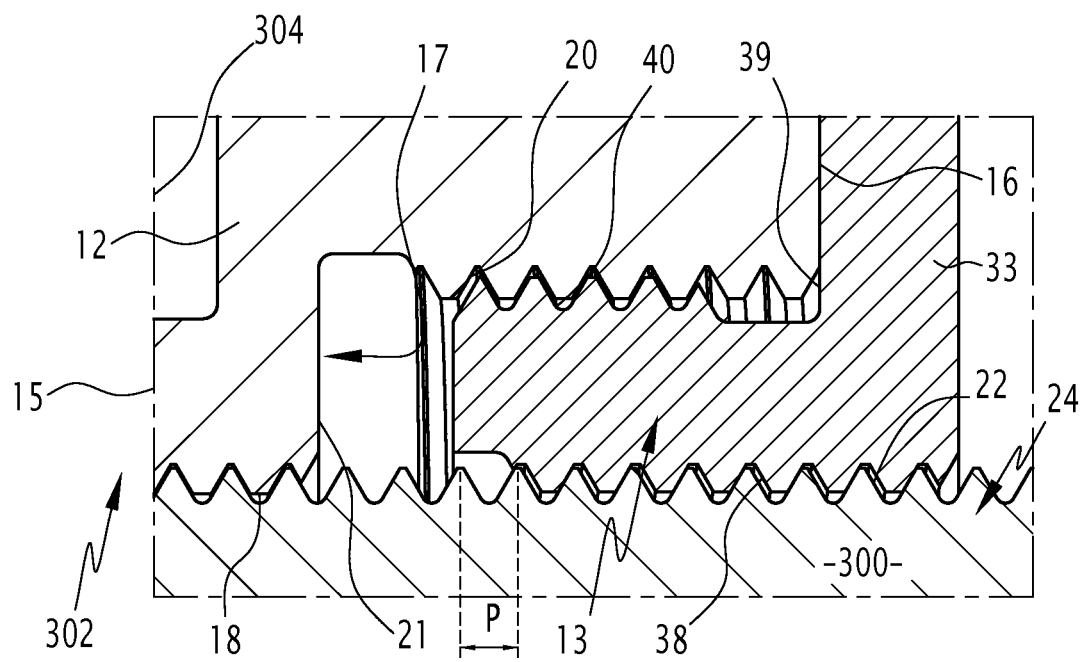
FIGS. 4 to 6 are detail views, in cross section, of a locking device produced from an assembly of FIG. 1, respectively in a first, a second and a third configuration.
Figure 5:
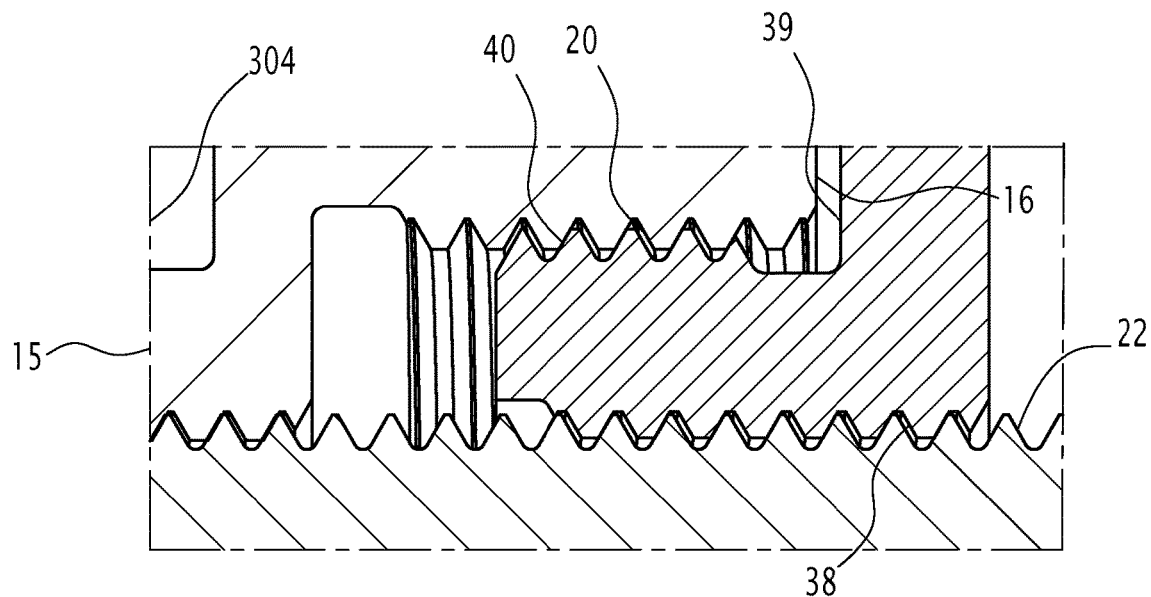
Figure 6:
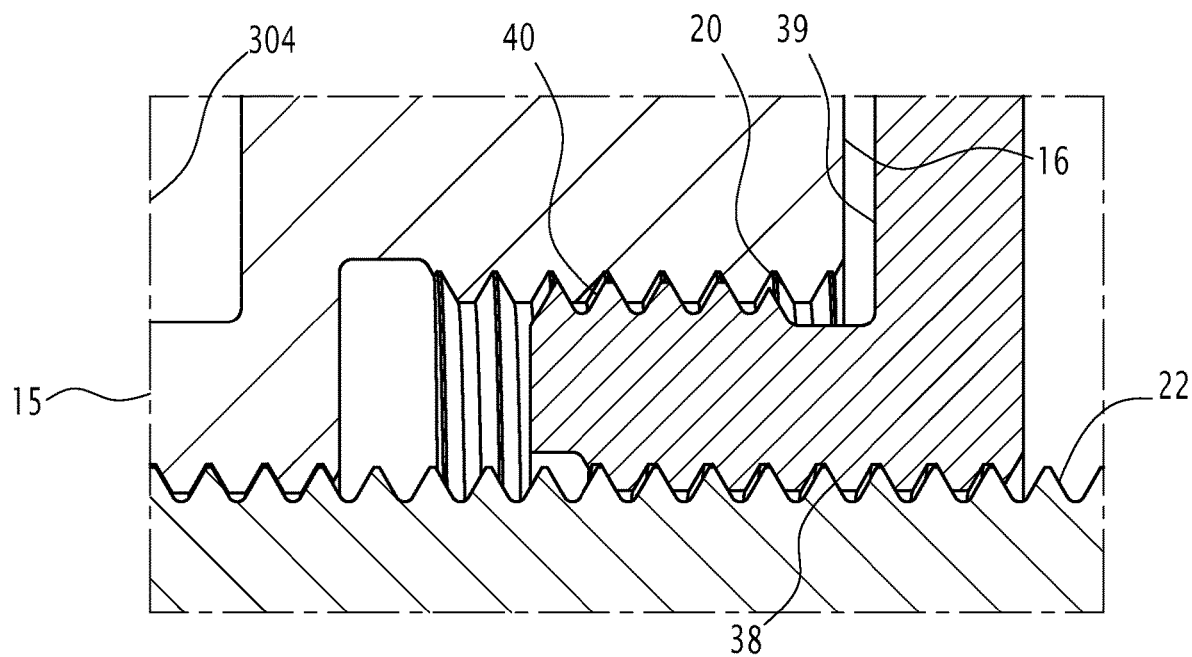

Each of FIGS. 1, 2 and 3 shows an assembly 10, 110, 210 for a locking device, respectively according to a first, a second and a third embodiment of the invention. FIGS. 4 to 6 show a locking device 300 formed from the assembly 10 of FIG. 1. Each of the assemblies 110 and 210 is adapted to be used to form a locking device analogous to the device 300.

In the following description, the assemblies 10, 110 and 210 will be described simultaneously, the common elements being designated by the same reference numbers.

The assembly 10, 110, 210 for locking device comprises a nut 12, 112, 212 and a ring 13, 113, 213. The assembly 210 of FIG. 3 further comprises a washer 214.

Each of the elements of the assembly 10, 110, 210 has a generally substantially circular or cylindrical shape, extending along a main axis X.

The nut 12, 112, 212 has an annular shape extending axially between a first end 15 and a second 16 end. Each of said first 15 and second 16 ends is formed by a planar surface, substantially perpendicular to the main axis X.

The nut 12, 112, 212 comprises an inner surface of revolution 17 of axis X. The inner surface 17 comprises a first 18 and a second 20 coaxial tappings. According to the axis X, said first 18 and second 20 tappings are respectively arranged on the side of the first end 15 and the second 16 end.

The first 18 and second 20 tappings are separated by a shoulder 21, arranged in a plane perpendicular to X. The inner surface 17 has a higher average diameter at the second tapping 20 than the first tapping 18.

The first tapping 18 has a first direction of rotation and the second tapping 20 has a second opposite direction of rotation. The first 18 and second 20 tappings have an identical pitch P, shown in FIG. 4.

The first tapping 18 is capable of interacting with a first thread 22 of a shaft 24, said shaft being included in the locking device 300 and shown in FIGS. 4 to 6. The first 18 and second 20 tappings will be described in more detail below.

The nut 12, 112, 212 further comprises an outer surface, a first portion of said outer surface comprising drive sections 26, 126, 226 allowing a tool to rotate said nut. Said drive sections 26, 126, 226 are in planes parallel to X. In the embodiments shown, drive sections 26, 126, 226 define a hexagonal section in a plane perpendicular to X.

A second part 27 of the outer surface of the nut, of substantially cylindrical shape of revolution of axis X, axially extends the first part comprising the drive sections 26, 126, 226. In the embodiment of FIG. 3, two recesses 28 are made in hollow in said second part 27. Said recesses 28 are arranged in planes parallel to each other and to the main axis X.

The ring 13, 113, 213 has an annular shape extending axially between a third 30 and a fourth 31 ends. Each of said third 30 and fourth 31 ends is formed by a planar surface, substantially perpendicular to the main axis X.

The ring 13, 113, 213 comprises a first 32 and a second 33, 133, 233 portions, coaxial and aligned along X. The first portion 32, arranged on the side of the third end 30, has a substantially cylindrical external shape. The second portion 33,133,233, arranged on the side of the fourth end 31, has an external shape protruding radially with respect to the first portion 32.

The ring 13, 113, 213 comprises an inner surface comprising a third tapping 38, opening onto the third end 30. Said third tapping 38 has the first direction of rotation and is capable of cooperating with the first thread 22 of the shaft 24.

Furthermore, an outer surface of the first portion 32 comprises a second thread 40. Said second thread 40 has the second direction of rotation and is capable of cooperating with the second tapping 20 of the nut 12, 112, 212.

The second portion 33, 133, 233 comprises an annular surface 39, perpendicular to X and oriented towards the first portion 321.

The second portion 33, 133, 233 further comprises driving surfaces for driving in rotation the ring 13, 113, 213. In the embodiments of FIGS. 1 and 3, the second portion 33, 233 has the shape of a collar; in the embodiment of FIG. 2, the second portion 133 is formed by tabs 141 arranged on the periphery of the first portion 321.

The drive surfaces of the second portion 33, 133, 233 comprise lateral drive surfaces 42, 142, 242, arranged in planes parallel to X. In the embodiments of FIGS. 1 and 3, the lateral drive surfaces 42, 242 have the same shape as the drive sections 26, 226, so as to make it possible to jointly drive the ring 13, 213 and the nut 12, 212. In the embodiment of FIG. 2, the lateral drive surfaces 142 are formed by planar ends of the tabs 141.

In the embodiments of FIGS. 1 and 3, the drive surfaces of the second portion 33, 233 further comprise front drive surfaces 44, 244, formed by bas-relief cuttings in the planar surface defining the fourth end 31.

In the embodiment of FIG. 3, the second portion 233 of the ring 213 comprises, on its outer circumference, notches 245 extending radially inwards. For example, the second portion 233, and in particular the annular surface 39 of said second portion, comprises two notches 245 arranged opposite each other with respect to the axis X. Preferably, each notch 245 is produced at a cutting 244.

FIGS. 4 to 6 show a locking device 300 made from the assembly 10 of FIG. 1. An analogous locking device can be obtained with previously described assemblies 110 and 210.

The locking device 300 comprises the shaft 24, the nut 12, the ring 13 and a ball bearing 302. Said ball bearing 302 is secured to the shaft 24, said shaft extending axially from a flat surface 304 of said ball bearing.

The first tapping 18 of the nut 12 is assembled to the first thread 22 of the shaft 24, the first end 15 of the nut being opposite the flat surface 304.

The third tapping 38 and the second thread 40 of the ring 13 are respectively assembled to the first thread 22 of the shaft 24 and to the second tapping 20 of the nut 12. The second end 16 of the nut is opposite the annular surface 39 of the collar 33 of the ring.

By convention, in the continuation of the description of the nut 12, of the ring 13 and of the shaft 24, the term "forward" indicates an axial direction oriented towards the ball bearing 302, whereas the term "backward" indicates an axial direction in the opposite direction.

FIGS. 4, 5 and 6 show the locking device 300 in a first, a second and a third configuration which will be described in more detail below.

A first aspect of the invention, relating to the first 18 and second 20 tappings of the nut 12, 112, 212, to the third tapping 38 and to the second thread 40 of the ring 13, 113, 213, as well as to the first thread 22 of the shaft 24, will now be described more precisely.

Figure 7:
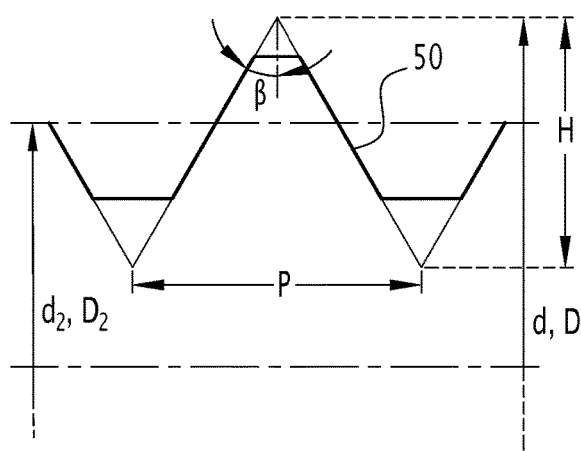
FIG. 7 is a schematic representation of an ISO-type root thread profile.

Preferably, said threads and tappings have an ISO profile, corresponding to a base profile 50 shown in FIG. 7. This profile is based on an equilateral triangle shape, corresponding to a half-angle of thread ß equal to 30°. H represents the height of the base triangle and P the pitch of the thread; d, D represent the nominal diameter, respectively of the thread and the tapping; $d_2$, $D_2$ represent the nominal diameter on the flank of the thread, respectively of the thread and the tapping.

Figure 8:
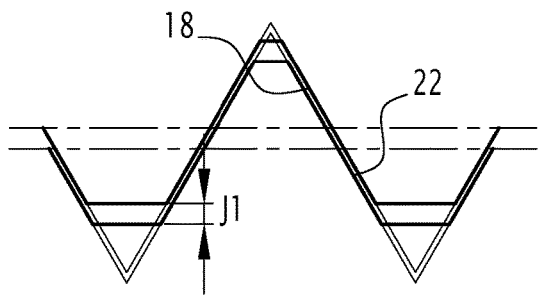
FIGS. 8 to 10 are detail views of the locking device of FIGS. 4 to 6.

FIG. 8 shows a detail view of the first tapping 18 of the nut 12, 112, 212 engaged with the first thread 22 of the shaft 24, defining a first radial clearance J1.

Figure 9:
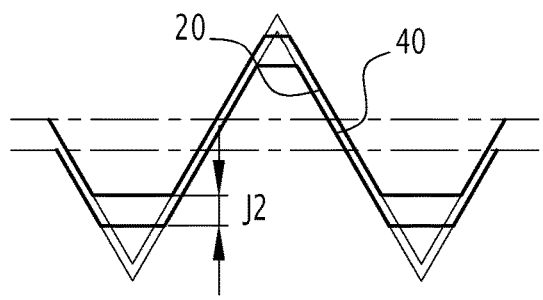

FIG. 9 shows a detail view of the second tapping 20 of the nut 12, 112, 212 engaged with the second thread 40 of the ring 13, 113, 213, defining a second radial clearance J2.

Figure 10:
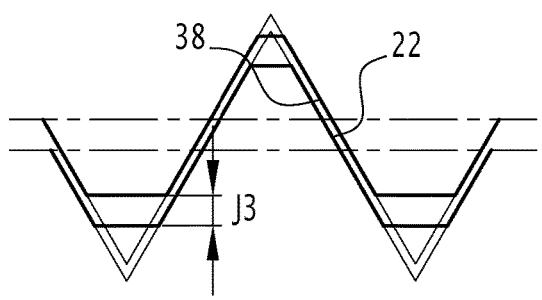

FIG. 10 represents a detail view of the third tapping 38 of the ring 13, 113, 213 engaged with the first thread 22 of the shaft 24, defining a third radial clearance J3. Each of the second J2 and third J3 radial clearances is greater than the first radial clearance J1.

An experimental example of the embodiment of FIG. 1 is detailed below: According to the standardized name ISO5855-1, the first thread 22 of the shaft 24 and the first tapping 18 of the nut 12 are respectively chosen from the type MJ57x1.5-4h6h and of the type MJ57x1.5-4H5H. It is therefore d=D=57 mm and P=1.5 mm. The names 4h6h and 4H5H represent the tolerance classes.

For the third tapping 38 of the ring 13, intended to engage with the first thread 22, a modified profile MJ57x1.5-4H5H is considered. Indeed, the thread flank diameter of the third thread 38 is increased by a value A relative to the minimum diameter on the thread flank of said profile. The term "minimum diameter" and "maximum diameter" is understood to mean, respectively, the lower limit and the upper limit of the tolerance margin.

The second thread 40 of the ring 13 is chosen from the type MJ64x1.5-4h6h, that is to say with a nominal diameter d equal to 64 mm, a pitch P=1.5 mm and a tolerance class 4h6h. It is identical to the first thread 22 of the shaft.

For the second tapping 20 of the nut 12, intended to engage with the second thread 40 of the ring, a modified profile MJ64x1.5-4H5H is considered. The thread flank diameter of the second tapping 20 is increased by the value A relative to the minimum diameter on the thread flank of said profile.

The positive offset A of diameters on the flanks of the second and third tappings 20 and 38 ensures a radial clearance between the thread flanks in the "nut/ring" assemblies on the one hand, and "ring/shaft" on the other hand. This offset is not inconvenient for mounting the locking device on the shaft, and makes it possible to turn the ring relative to the nut in order to bring it either into a so-called locked position or in a so-called braked position, at an angle sufficient to unlock the locking device. Each of the locked and braked positions corresponds to a contact of thread flanks of the first 18 and third 38 tapped with thread flanks of the first thread 22, the nut being pressed against the ball bearing 302. The locked and braked positions will be detailed below.

Advantageously, the minimum offset A is calculated according to the formula below:

$$A \geq (2P \times \alpha)/(360° \times \tan \beta)$$

with

P=thread pitch of the shaft 24,

α=desired minimum clamping angle, expressed in degrees,

ß=half-angle of the ISO thread, expressed in degrees.

The minimum diameter on flank of the second and third tappings 20 and 38 is chosen to be equal to the maximum diameter on flank of the respective ISO thread on which they are engaged—that is to say respectively the second thread 40 and the first thread 22 of the shaft 24—increased by the value of the offset A:

$$D_2 \min = d_2 \max + A$$

$D_2$ min, modified minimum thread flank diameter, $d_2$ max, the maximum thread flank diameter of the facing thread.

The maximum flank diameter of the second and third tappings 20 and 38 is equal to the minimum flank diameter of the second and third tappings 20 and 38 increased by a manufacturing tolerance value IT, chosen by the manufacturer:

$$D_2 \max = D_2 \min + IT$$

For example, for an ISO thread with a pitch P equal to 1.5 mm, with a thread angle of 60°, and a desired tightening angle of 15°, the offset A is at least equal to:

$$A \geq (2 \times 1.5 \times 15°)/(360° \times \tan 30°) = 0.217 \text{ mm}.$$

The maximum diameter on the flank of the second thread 40 of the type ISO MJ64x1.5-4H5H is equal to 63.026 mm. The minimum diameter on the flank of the second tapping 20 of the type MJ57x1.5-4h6h modified with respect to the ISO profile is therefore equal to:

$$D_2 \min_{20} = 63.026 + 0.217 = 63.243 \text{ mm}$$

By taking a manufacturing tolerance of 0.132 mm, identical to the tolerance of the profile MJ64x1.5-4H5H between the maximum diameter and the minimum thread flank diameter, the modified thread flank maximum diameter is therefore $$D_2 \max_{20} = 63.243 + 0.132 = 63.375 \text{ mm}.$$

In the same manner, the minimum and maximum flank diameters of the third tapping 38 are calculated, and the following dimensions are obtained:

$$D_2 \min_{38} = 56.026 + 0.217 = 56.243 \text{ mm}$$

$$D_2 \max_{38} = 56.243 + 0.132 = 56.375 \text{ mm}.$$

The offset between the second and third tappings 20 and 38 is therefore theoretically the same, although in reality, with manufacturing tolerances, the size of the profiles can vary within the tolerance interval.

The offset A can alternatively be defined by choosing a tolerance class of the second 20 and third 38 tappings greater than the tolerance class of the first tapping 18. For example, the first thread 22 of the shaft 24 and the second thread 40 of the ring 13 are defined with a tolerance class 4h6h according to the standard ISO965. The first tapping 18 of the nut 12 is defined with a tolerance class 4H5H according to this same standard so as to define the first radial clearance J1 between the thread F and the first tapping 18 of the nut. The flank diameters of the second 20 and third 38 tappings are defined with a higher tolerance class, for example a tolerance class 7H, so as to provide the second J2 and third J3 radial clearances. Thus, the first nominal/minimum radial clearance J1 is 116 μm/0 μm; and the second J2 and J3 nominal/minimum radial clearances are 249 μm/133 μm.

In this example, an offset A of 133 μm makes it possible to turn the ring relative to the nut with an angular range of +/−17° with respect to a nominal position where all the clearances are centered. In reality, by integrating the manufacturing tolerance intervals and considering the fact that the fixing device is not infinitely rigid, the angular range of rotation of the ring 13 varies between 18° and 50°.

Advantageously, the positive offset A of diameters on the flanks of the second and third tappings is chosen to obtain an angle of locking or unlocking of the ring with respect to the nut varying between 10 and 90°. Below 10°, the angle is too small to properly control the locking and unlocking of the locking device, and above 90°, the clearance between diameters on flanks becomes too large and there is no longer enough contact surface between the flanks of the engaged threads to ensure effective locking.

Varying the thread flank diameters of certain threads/ tappings while maintaining a same pitch P between all the threads/tappings of the locking device 300 makes it possible to systematically guarantee that the assembly 10, 110, 210 can be mounted on the shaft 24. Furthermore, the manufacture is simplified because only one tool is needed to perform all the tappings, even the modified tappings. The radial offset generated by the increase in diameter on the flank can in fact be achieved with the tool used to make the unmodified tapping, simply by radially shifting the tool to create offset A. The radial offset thus has an advantage over an axial dimension offset, which requires a specially shaped tool to make a modified thread.

Another advantage of the radial offset is that the choice of a rotation angle in order to bring the device into a locking position makes it possible to calculate a maximum torque to be applied to the ring, which torque can be given as a setpoint to an operator. An angle instruction is effectively complicated to comply with, due to the inertia of the tools and uncertainties of the measurement tools.

A second aspect of the invention, relating to the embodiment of FIG. 1, will now be described more precisely.

Figure 11:
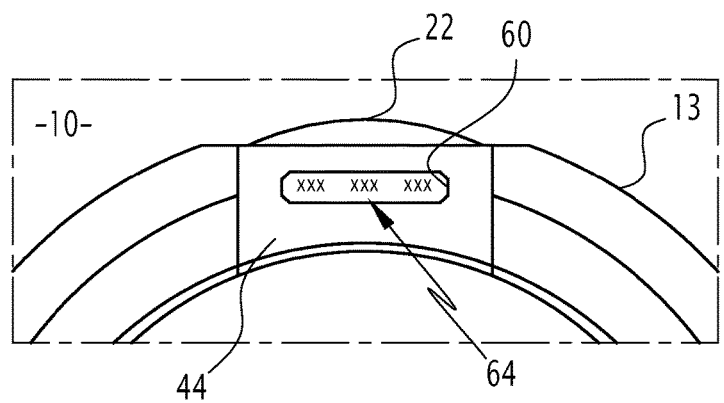
FIG. 11 is a detail view of the assembly for a locking device of FIG. 1.

The assembly 10 of FIG. 1 is provided with a visual means making it possible to easily identify whether the locking device is actually locked. In particular, the ring 13 comprises through-holes 60 arranged on the second portion 33 of the ring 13. FIG. 11 shows a detailed view of the ring 13 assembled to the nut 12 at a through-hole 60.

The second end 16 of the nut 12, opposite the through-holes 60, is provided with markings 64, for example a colour or a word, such as "LOCK", which indicates by convention that the locking device is locked when the one or more markings are visible through the at least one through-hole 60.

Preferably, each cutting 44 of said second portion 33 is traversed axially by a through-hole 60. Other arrangements are possible, as indicated above.

The second aspect of the invention described above may be combined with the first aspect of the invention described above. Said second aspect of the invention can also be adapted to a prior art locking device, such as that described in document EP0130304.

A third aspect of the invention, relating to the embodiment of FIG. 3, will now be described more precisely.

Figure 12:
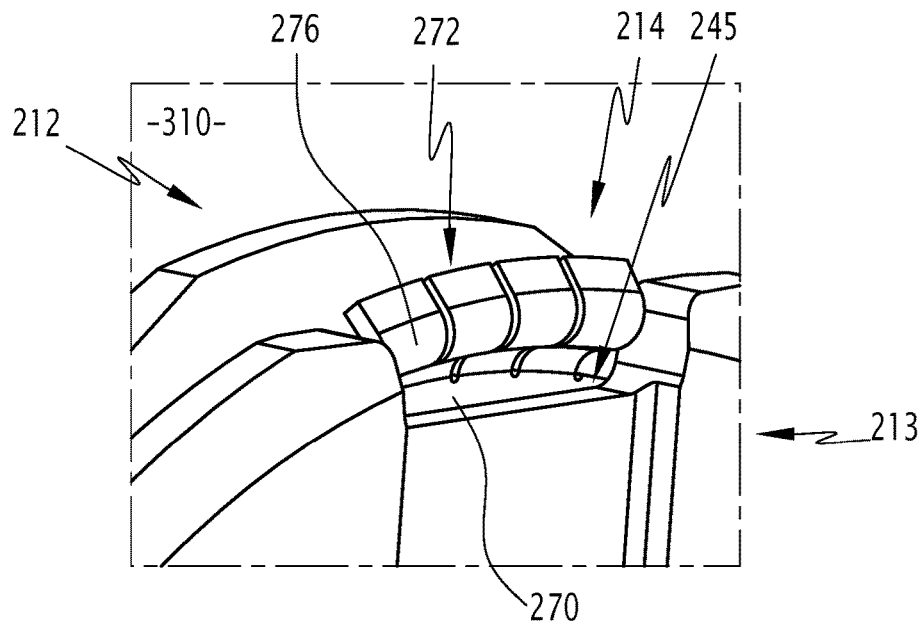
FIG. 12 is a detail view of a locking device made from an assembly of FIG. 3.

FIG. 12 depicts a detailed view of a locking device 310 in the locked position. The locking device 310 is produced from the assembly 210 and a shaft 24 (not shown) in a similar manner to the locking device 300.

According to the third aspect of the invention, the assembly 210 comprises a means for positive locking of the locking device 310, formed by the washer 214. The washer 214 comprises an annular body 270 and two tabs 272 extending radially outwards with respect to said annular body. A tab 272 is in particular visible in FIG. 12.

The annular body 270 is configured so as to be able to be inserted around the second part 27 of the outer surface of the nut 212. An inner periphery of the annular body 270 comprises flats 274 (FIG. 3) capable of engaging in the recesses 28 of said second part 27, in order to lock the washer 214 in rotation relative to the nut 212.

The two tabs 272 are preferably located opposite each other with respect to the axis X. Each tab 272 extends at the periphery of the annular body 270 over an arc length less than an arc length of a notch 245 of the ring 213.

The tabs 272 are elastically deformable between a rest configuration and a stress configuration. In the embodiment of FIGS. 3 and 12, each tab 272 is formed by a plurality of tabs 276 juxtaposed along the periphery of the annular body 270. In the rest configuration, visible in FIGS. 3 and 12, each tab 276 has a hook shape projecting axially relative to the annular body 270.

In the locked position visible in FIG. 12, each of the tabs 272, in the rest configuration, is housed in a notch 245 of the ring 213. The hook shape of the tabs 276 rotationally locks the tab 272 in the notch 245.

The flats 274 and the tabs 272 are configured and positioned such that each tab 272 naturally snaps into a notch 245 of the ring when the locking device 310 is in the locked position.

In the stress configuration, the tabs 276 are stressed in flexion and pushed back so that the tabs 272 are substantially coplanar with the annular body 270. In particular, when the nut 212 and the ring 213 are in an angular configuration different from the locked position, the tabs 272 are held in a stress configuration by the second end 16 of the nut and by the annular surface 39 of the ring. A method for assembling and disassembling the locking device 310 will be detailed below.

The third aspect of the invention described above may be combined with the first aspect and/or the second aspect of the invention described above. Said third aspect of the invention can also be adapted to a prior art locking device, such as that described in document EP0130304.

Figure 13:
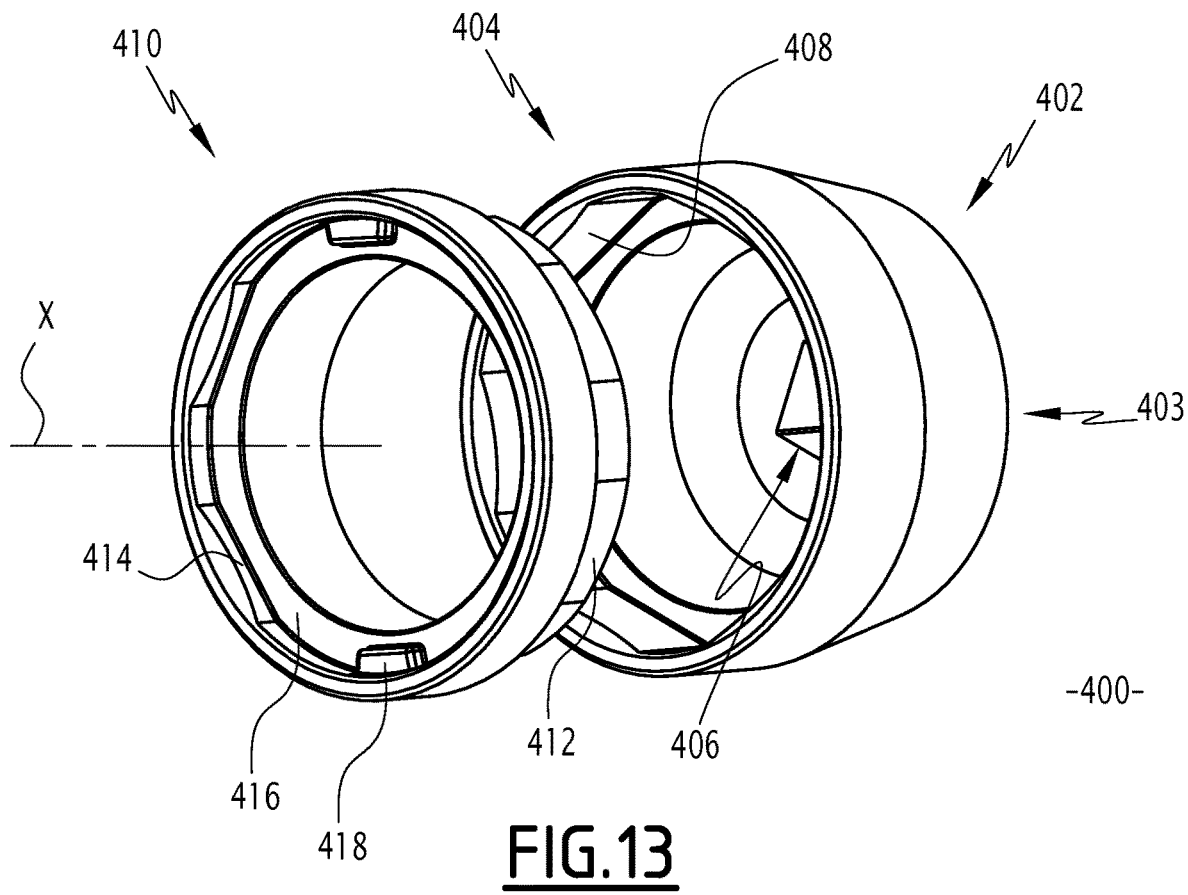
FIG. 13 is an exploded perspective view of a mounting tool for the locking device of FIGS. 4 to 6

FIG. 13 represents a tool 400 for mounting the assembly for the locking device 300, 310. The mounting tool 400 is capable of mounting the assembly 10, 110, 210 on the previously described shaft 24. It is considered that the mounting tool 400 extends along the same main axis X as the assembly 10, 110, 210.

The mounting tool 400 comprises a socket 402. Said socket comprises a tubular body extending between a first end 403 and a second end 404. The first end 403 comprises a non-circular opening 406 for fitting with a shaft of the same section of a setting tool. The second end 404 comprises an inner surface having flats 408 capable of engaging with the drive sections 26, 126, 226 of the nut 12, 112, 212 and with the lateral drive surfaces 42, 142, 242 of the ring 13, 113, 213 aligned with each other along the axis X.

According to one embodiment, the mounting tool 400 further comprises a tubular sheath 410 intended to dismantle the locking device 310 of FIG. 12. A first end of said sheath 410 comprises a drive outer surface 412 complementing the flats 408 of the socket. Said outer driving surface 412 is capable of being inserted into the second end 404 of the socket 402 so that the sheath 410 is driven in rotation with said socket.

A second end of said sheath comprises an inner driving surface 414 complementary to the lateral driving surfaces 242 of the ring 213. Said inner driving surface 414 leads to a planar shoulder 416, substantially perpendicular to X.

The sheath 410 further comprises two projections 418 situated facing one another with respect to the main axis X. The projections 418 extend radially inwards relative to the inner driving surface 414 and axially towards the second end of the sheath relative to the planar shoulder 416.

A method of mounting the locking device 300 from the assembly 10 will now be described.

The second thread 40 of the ring 13 is screwed into the second tapping 20 of the nut 12, so that the driving sections 26 of said nut and the lateral driving surfaces 42 of said ring are aligned. The assembly thus formed is assembled to the socket 402, said drive sections 26 and lateral drive surfaces 42 being inserted into the flats 408. The socket 402 is assembled with a setting tool which makes it possible to screw together on the shaft 24 the assembled nut 12 and the ring 13. The screwing is continued until the first end 15 of the nut 12 is in contact with the surface 304 of the ball-bearing 302.

The socket 402 is then withdrawn so that the second end 404 only drives the lateral drive surfaces 42 of the ring 13. In order to bring the locking device into the so-called locked position, said ring 13 is screwed in the same direction as the first thread 22 of the shaft 24. In order to bring the locking device into the so-called braked position, the ring 13 is screwed in the reverse direction of said first thread 22.

Two starting positions are possible to bring the locking device 300 into a locked or braked position. A first starting position consists in screwing the ring 13 into the nut 12 until the annular surface 39 of said ring comes into contact with the second end 16 of said nut. In order to bring the locking device 300 into the locked position, the ring 13 is rotated relative to the nut 12 in the direction of the first thread 22 of the shaft 24. This rotation of the ring 13 is of a small angle, of the order of a few degrees.

A second starting position consists in screwing the ring 13 into the nut 12 until the annular surface 39 comes into contact with the second end 16 of the nut, and then pivoting the ring 13 in the opposite direction with respect to said nut. This reverse rotation corresponds to a half pitch, ie 180°. The annular surface 39 of the ring 13 is thus separated from the second end 16 of the nut.

Then, in order to bring the locking device 300 into the locked position, the ring 13 is rotated relative to the nut 12 in the direction of the first thread 22 of the shaft 24. This rotation of the ring 13 is of one of the order of one to two tens of degrees. The locking of the locking device starting from the second starting position has the advantage of better controlling the tightening torque applied to the ring.

Alternatively, in order to bring the locking device 300 in the braked position, the ring 13 is turned relative to the nut 12 in the reverse direction of the first thread 22, by an angle of the order of one to two tens of degrees.

In the locked position, as in the braked position, once the nut 12 is screwed and supported on the ball bearing 302, the first end 15 of said nut is in contact with the surface 304 of the ball bearing and the rear thread flanks of the first tapping 18 of the nut are in contact with the front thread flanks of the first thread 22 of the shaft.

The first configuration of the locking device 300, as shown in FIG. 4, corresponds to the locked position as obtained from the previously described first starting position. In this configuration, the second end 16 of the nut is in contact with the annular surface 39 of the ring, the rear thread flanks of the third tapping 38 of the ring are in contact with the front thread flanks of the first thread 22 of the shaft. The thread flanks of the second tapping 20 of the nut and of the second thread 40 of the ring are not in contact.

The second configuration of the locking device 300, as shown in FIG. 5, corresponds to the locked position as obtained from the previously described second starting position. In this configuration, the second end 16 of the nut is not in contact with the annular surface 39 of the ring, the rear thread flanks of the third tapping 38 of the ring are in contact with the front thread flanks of the first thread 22 of the shaft, and the rear thread flanks of the second tapping 20 of the nut are in contact with the front thread flanks of the second thread 40 of the ring.

A locking device 300 corresponding to the experimental example of the embodiment of FIG. 1, described above, has been tested in the locked position in a test bench. Once the locking device is locked, a torque of 450 N·m applied to the nut does not allow the nut/ring assembly to be unscrewed, regardless of the starting position used.

The third configuration of the locking device 300, as shown in FIG. 6, corresponds to the braked position as obtained from the previously described second starting position. In this configuration, the second end 16 of the nut is not in contact with the annular surface 39 of the ring, the front thread flanks of the third tapping 38 of the ring are in contact with the rear thread flanks of the first thread 22 of the shaft, while the front thread flanks of the second tapping 20 of the nut are in contact with the rear thread flanks of the second thread 40 of the ring.

A locking device 300 corresponding to the experimental example of the embodiment of FIG. 1, described above, was tested in the braked position in a test bench. Once the locking device is braked, a torque of 200 N·m applied to the nut allows the nut/ring assembly to be unscrewed.

This torque remains two times greater than the maximum braking torques of the EN3299 or EN4376 standards. The term of braking is therefore used to indicate that it is possible to unscrew the locking device, although the torques required for unlocking the locking device remain largely greater than the torques conventionally induced by vibrations applied to the shaft/locking device system, and mentioned in said standards.

In the third aspect of the invention described above, a method of mounting the locking device 310 from the assembly 210 by means of the mounting tool 400 will now be described.

The annular body 270 of the washer 214 is inserted around the second portion 27 from the outer surface of the nut 212, the flats 274 take place in the recesses 28. The second thread 40 of the ring 213 is then screwed into the second tapping 20 of the nut 212, so that the drive sections 226 and the lateral drive surfaces 242 are aligned. The assembly thus formed is assembled with the socket 402 and screwed onto the shaft 24, as in the method for mounting the previously described locking device 300.

The ring 213 is then screwed with respect to the nut 212 to the locked or braked position. Before said locked position is reached, the tabs 272 of the washer 214 are held in the plane of the annular body 270 by the second end 16 of the nut and by the annular surface 39 of the ring. The ring can thus be pivoted relative to the nut. When the second start position is used assembly is made by using the sheath 410 to keep the tabs 272 of the washer constantly pushed back by the projections 418 of the sheath 410, even when the tabs are each facing a notch 245 formed in the annular surface.

When the locked position is reached, each tab 272 is opposite a notch 245 formed in the annular surface 39. The mounting tool 400 is then moved back. The tab 272 then deforms elastically to resume its rest configuration, rotationally locking the ring 213 and the nut 212.

The washer 214 performs two functions: a first function is to guarantee a positive locking between the nut 212 and the ring 213, by the engagement of the flats 274 with the recesses 28 of the nut, and tabs 272 with the notches 245 of the ring. A second function is to provide a visual indication of the lock, each tab 272 being visible in a notch 245 when the locked position of the locking device 310 is reached.

A method for disassembling the locking device 310 will now be described. The sheath 410 of the mounting tool 400 is assembled with the socket 402, and is advanced so as to come into contact with the ring 213, on which the washer 214 is inserted. The projections 418 push axially the tabs 276 in the direction of the nut 212. The tabs 272 are thus pushed back, which in turn releases the ring 213 relative to the nut 212. The ring 213 can rotate freely by driving the drive surfaces by the drive surfaces 414 which are complementary to the sheath. The sheath is removed from the socket and the assembly 210 is removed as a unit, by rotating it in the reverse direction of the first thread 22, by means of the socket 402 alone.

The invention claimed is:

1. Assembly for a locking device, extending along a main axis (X) and comprising:
   a nut comprising a first and a second coaxial and opposite-direction tappings; and
   a ring;
   an inner surface of said ring comprising a third tapping; the first and third tappings being capable of cooperating with a same first thread;
   an outer surface of said ring comprises a second thread capable of cooperating with the second tapping of the nut;
   the assembly being characterised in that it further comprises a washer configured so as to be inserted around one of the nut and of the ring, in a rotationally fixed manner with respect to said nut or to said ring,
   the washer comprises a means of elastic engagement with the other of the ring and of the nut in an installation position of the assembly, so as to prevent rotation relative to the other of the ring and the nut from said installation position.

2. Assembly according to claim 1, wherein the washer comprises an annular body and at least one tab projecting radially with respect to said annular body,
   said annular body comprises a means for blocking in rotation with one of the nut and of the ring,
   said at least one tab being elastically deformable between a rest configuration and a stress configuration, in which the at least one tab is respectively in axial projection with respect to the annular body and substantially coplanar with said annular body,
   the assembly being configured such that, in the installation position, the at least one tab is in the rest configuration, the axial projection of said at least one tab being able to block in rotation relative to each other the ring and the nut.

3. Assembly according to claim 2, wherein the nut and the ring respectively comprise a first and a second surfaces substantially perpendicular to the main axis, such that when the nut and the ring are in an angular configuration different from the installation position, said first and second surfaces are able to hold the at least one tab in the stress configuration,
   one of the first or second surfaces comprises at least one notch capable of being assembled with said at least one tab in the rest configuration in the installation position of the assembly.

4. Assembly according to claim 1, in which the first, second and third tappings and the second thread have an identical and constant thread pitch (P).

5. Assembly according to claim 1, in which:
   the nut comprises first drive surfaces for rotatably driving said nut relative to the first thread and/or with respect to the ring;
   the ring comprises second drive surfaces for rotatably driving said ring relative to the first thread and/or with respect to the nut;
   said first and second driving surfaces being configured to align with each other, so as to enable rotational driving of the nut together with the ring.

6. Assembly according to claim 5, wherein the first and second drive surfaces are formed by planes substantially parallel to the main axis (X).

7. Locking device, comprising:
   a shaft comprising a first thread, and
   an assembly according to claim 1, the first and third tappings being capable of cooperating with said first thread.

8. The locking device according to claim 7, wherein the installation position of the assembly corresponds to a contact of thread flanks of the first and third tappings with thread flanks of the first thread.

9. Kit for mounting a locking device, said mounting kit comprising:
   an assembly according to claim 1; and
   a mounting tool comprising:
      a tubular socket, an end of said socket comprising an inner surface capable of engaging with the first and second driving surfaces, respectively of the nut and of the ring, for rotational driving of the nut together with the ring; and
      a tubular sheath comprising a first and a second end, capable of engaging respectively with the inner surface of the socket and with the second driving surfaces of the ring, for rotational driving of the ring with respect to the nut,
      the sheath further comprises at least one projection capable of deforming the at least one tab of the washer from the rest configuration to the stress configuration, so as to allow rotation of the ring relative to the nut from the installation position.

* * * * *